(12) United States Patent
Sugiyama et al.

(10) Patent No.: US 7,840,233 B2
(45) Date of Patent: Nov. 23, 2010

(54) WIRELESS COMMUNICATION SYSTEM, WIRELESS COMMUNICATION METHOD AND WIRELESS COMMUNICATION APPARATUS

(75) Inventors: Tomonori Sugiyama, Shizuoka (JP); Jun Yaginuma, Izunokuni (JP)

(73) Assignee: Toshiba Tec Kabushiki Kaisha (JP)

( * ) Notice: Subject to any disclaimer, the term of this patent is extended or adjusted under 35 U.S.C. 154(b) by 568 days.

(21) Appl. No.: 11/895,244

(22) Filed: Aug. 23, 2007

(65) Prior Publication Data

US 2008/0051056 A1 Feb. 28, 2008

(30) Foreign Application Priority Data

Aug. 24, 2006 (JP) ............................. 2006-227918

(51) Int. Cl.
*H04Q 7/20* (2006.01)
(52) U.S. Cl. ........................ 455/523; 455/517; 455/500; 455/561; 455/67.11; 455/422.1; 343/702
(58) Field of Classification Search ................ 455/523, 455/517, 500, 501, 422.1, 403, 560, 550.1, 455/561; 343/702, 726, 727, 740, 747, 865, 343/904, 905
See application file for complete search history.

(56) References Cited

U.S. PATENT DOCUMENTS 5,465,395 A * 11/1995 Bartram ...................... 455/523

7,627,250 B2 * 12/2009 George et al. ............... 398/115
2007/0258417 A1 * 11/2007 Harvey et al. ............... 370/338

FOREIGN PATENT DOCUMENTS

| JP | 61-220531 | | 9/1986 |
|---|---|---|---|
| JP | 4-167717 | | 6/1992 |
| JP | 11112408 A | * | 4/1999 |
| JP | 2005-094463 | | 4/2005 |
| JP | 2005-159745 | | 6/2005 |

OTHER PUBLICATIONS

English Translation of Office Communication from a related application in Japan dated Aug. 5, 2008.

* cited by examiner

*Primary Examiner*—Keith T Ferguson
(74) *Attorney, Agent, or Firm*—Harness, Dickey & Pierce, P.L.C.

(57) ABSTRACT

One end of a balanced line is connected to a base station. A transmitting and receiving antenna is connected to the other end of the balanced line. The balanced line not only transmits a signal sent from the base station to the transmitting and receiving antenna and at the same time leaks a part of the transmitted signal as the radio waves, but also transmits the received signal at the transmitting and receiving antenna to the base station. In a room where the balanced line is laid, wireless communication terminals are provided. The wireless communication terminals transmit and receive radio waves to or from either the balanced line or the transmitting and receiving antenna.

15 Claims, 5 Drawing Sheets

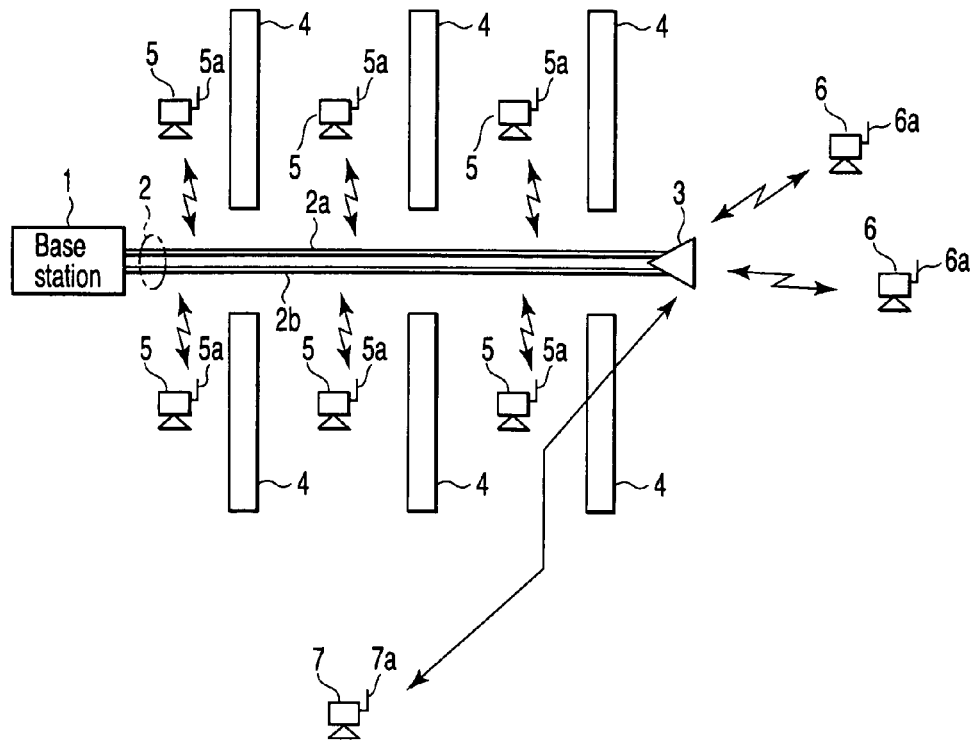
F I G. 1
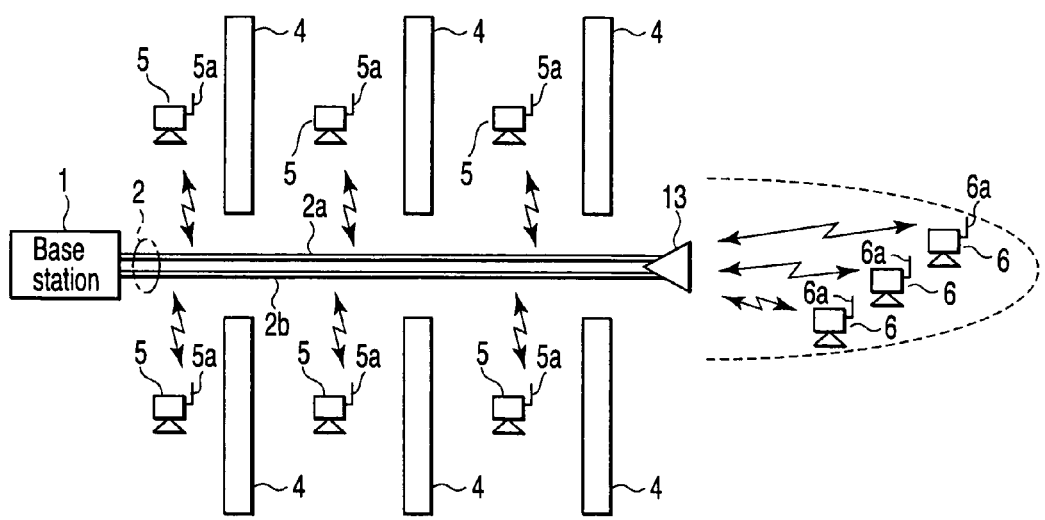
F I G. 2

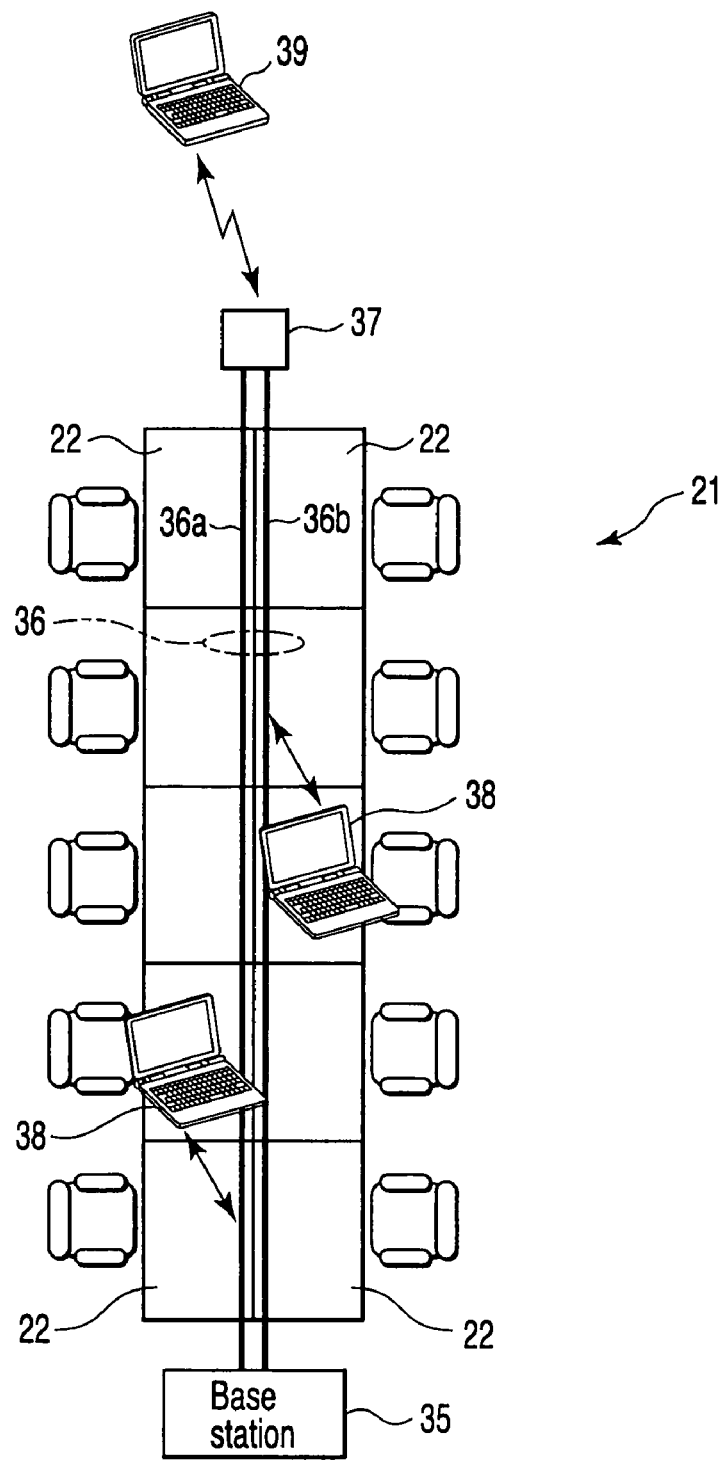
F I G. 4

WIRELESS COMMUNICATION SYSTEM, WIRELESS COMMUNICATION METHOD AND WIRELESS COMMUNICATION APPARATUS

CROSS-REFERENCE TO RELATED APPLICATIONS

This application is based upon and claims the benefit of priority from prior Japanese Patent Application No. 2006-227918, filed Aug. 24, 2006, the entire contents of which are incorporated herein by reference.

BACKGROUND OF THE INVENTION

1. Field of the Invention

This invention relates to a wireless communications system which performs wireless communication between a base station and a wireless communication terminal.

2. Description of the Related Art

In a wireless communications system which performs wireless communication between a base station and a wireless communication terminal, one end of a balanced line is connected to a base station and a matching impedance element is connected to the other end of the balanced line. A part of the signal sent from the base station to the balanced line leaks from the balanced line as the radio waves. The leaked radio waves are received by the antenna of a wireless communication terminal. The radio wave transmitted from the wireless communication terminal is received by the balanced line. The received signal is transmitted to the base station through the balanced line.

A wireless communications system having such a communication function has been disclosed in, for example, Jpn. Pat. Appln. KOKAI Publication No. 2005-94463.

The balanced line is more lightweight and more flexible than an ordinary leakage transmission cable and is therefore easier to lay.

However, since a matching impedance element is connected to the other end of the balanced line, when there is a wireless communication terminal in the direction in which the other end of the balanced line extends, a problem arises: wireless communication between the wireless communication terminal and the base station cannot be performed.

BRIEF SUMMARY OF THE INVENTION

An object of an embodiment of the invention is to provide a wireless communications system which enables reliable good wireless communication between a wireless communication terminal and a base station even if the wireless communication terminal exists in the direction where the other end of the balanced line extends.

According to an aspect of the invention, there is provided a wireless communications system comprising:

a base station; a balanced line one end of which is connected to the base station; a transmitting and receiving antenna which is connected to the other end of the balanced line; and one or more wireless communication terminals which transmit or receive radio waves to or from either the balanced line or the transmitting and receiving antenna.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 shows the configuration of a first embodiment of the invention;

FIG. 2 shows the configuration of a second embodiment of the invention;

FIG. 4 shows the configuration of a fourth embodiment of the invention;

DETAILED DESCRIPTION OF THE INVENTION

Figure 3:
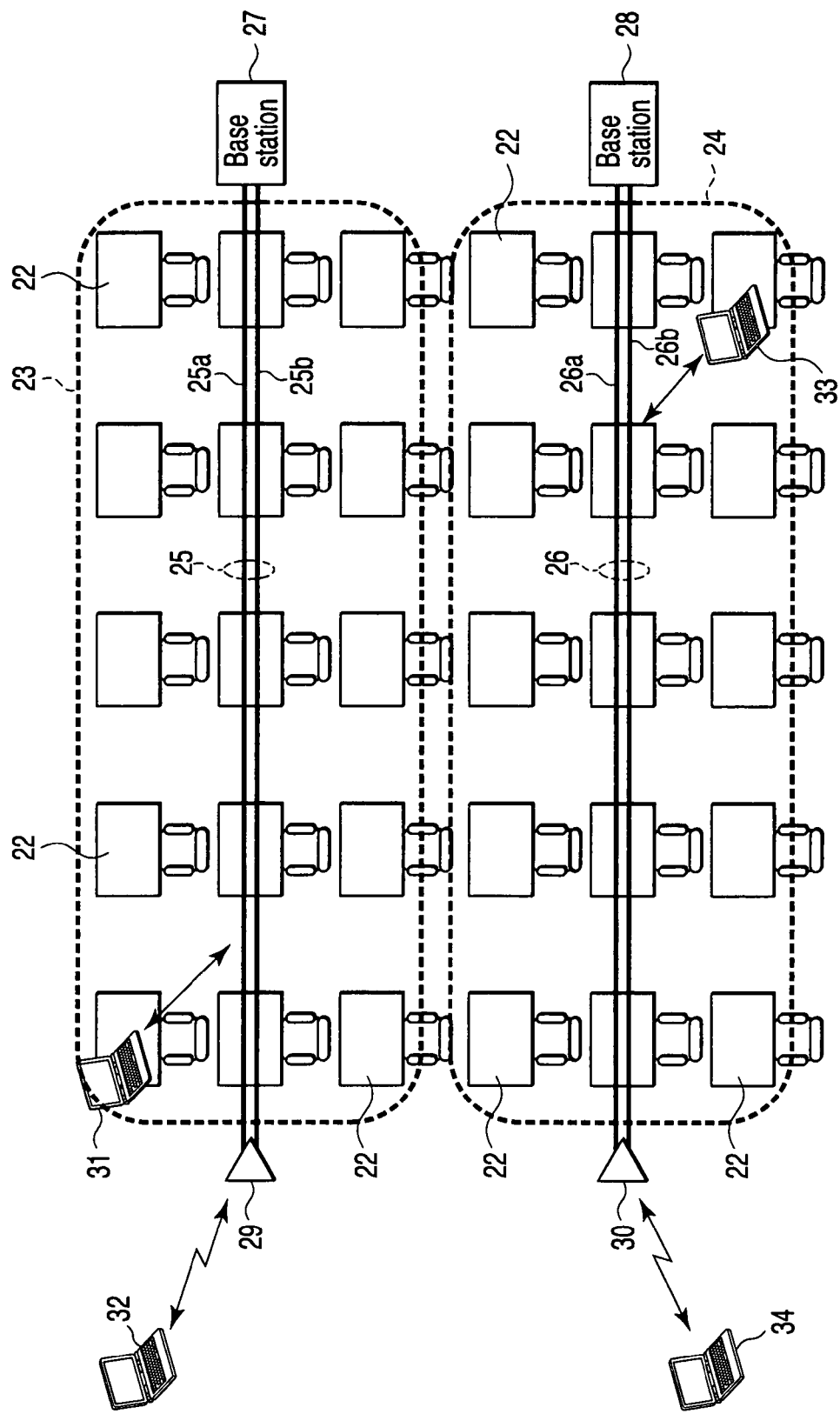
FIG. 3 shows the configuration of a third embodiment of the invention.

[1] Hereinafter, a first embodiment of the invention will be explained.

As shown in FIG. 1, one end of a balanced line 2 composed of a pair of lines 2a, 2b is connected to a base station 1. A nondirectional transmitting and receiving antenna 3 is connected to the other end of the balanced line 2.

The balanced line 2 not only transmits the signal transmitted from the base station 1 and at the same time leaks a part of the transmitted signal as the radio waves but also transmits the received signal at the transmitting and receiving antenna 3 to the base station 1. The balanced line 2 is more lightweight and more flexible than an ordinary leakage transmission cable. The balanced line 2 is laid on, for example, the reverse side of a ceiling of an office or a floor of the office. In the office, a plurality of shelves 4 are provided so as to be spaced apart.

Then, in the office, a plurality of wireless communication terminals 5 are provided between the shelves 4 and the position which it can keep seeing the balanced line 2. Each of the wireless communication terminals 5 has a transmitting and receiving antenna 5a. Further in the office, a plurality of wireless communication terminals 6 are provided in the direction in which the other end of the balanced line 2 extends. Each of the wireless communication terminals 6 has a transmitting and receiving antenna 16a. Still further in the office, one or more wireless communication terminals 7 are provided in positions away from the balanced line 2 and transmitting and receiving antenna 3. The wireless communication terminal 7 has a transmitting and receiving antenna 7a.

The wireless communication terminals 5, 6, 7 may be movable or immovable.

The operation of the first embodiment will be explained.

The signal sent from the base station 1 is transmitted through the balanced line 2. At the same time, a part of the signal leaks around as the radio waves. The leaked radio wave is received by the transmitting and receiving antenna 5a of each of the wireless communication terminals 5 located the position which it can keep seeing the balanced line 2. The radio wave radiated from the transmitting and receiving antenna 5a of each of the wireless communication terminals 5 is received by the balanced line 2. The received signal is transmitted to the base station 1 through the balanced line 2.

Thus wireless communication between the base station 1 and each wireless communication terminal 5 becomes possible.

Each wireless communication terminal 6 located in the direction in which the other end of the balanced line 2 extends cannot receive radio waves leaked from the balanced line 2. However, since the signal sent from the base station 1 is transmitted to the transmitting and receiving antenna 3 through the balanced line 2, radio waves are radiated from the transmitting and receiving antenna 3. The radiated radio waves are received by the transmitting and receiving antenna 6a of each wireless communication terminal 6. The radio waves radiated from the transmitting and receiving antenna 6a of each wireless communication terminal 6 are received by the transmitting and receiving antenna 3. The received signal is transmitted to the base station 1 through the balanced line 2.

Accordingly, even when each wireless communication terminal 6 exists in the direction in which the other end of the balanced line 2 extends, reliable good wireless communication between the base station 1 and each of the wireless communication terminals 6 can be performed.

The radio waves leaked from the balanced line 2 are so weak that the wireless communication terminal 7 located in a position away from the balanced line 2 and transmitting and receiving antenna 3 cannot receive the radio waves. However, the radio waves radiated from the nondirectional transmitting and receiving antenna 3 reach the wireless communication terminal 7 and are received by the antenna 7a of the wireless communication terminal 7. Moreover, the radio waves radiated from the transmitting and receiving antenna 7a of the wireless communication terminal 7 are received by the transmitting and receiving antenna 3. The received signal is transmitted to the base station 1 through the balanced line 2.

Accordingly, even when a wireless communication terminal 7 exists in a position far away from the balanced line 2 and transmitting and receiving antenna 3, reliable good wireless communication between the base station and each of the wireless communication terminals 7 can be performed.

Since the balanced line 2 is lightweight and flexible, it is easy to lay it on the ceiling of the office. Moreover, when the layout of the individual shelves has been changed, the work of laying the balanced line 2 again is easy.

[2] A second embodiment of the invention will be explained.

As shown in FIG. 2, a transmitting and receiving antenna 13 is connected to the other end of the balanced line 2 in place of the nondirectional transmitting and receiving antenna 3. The transmitting and receiving antenna 13 has directivity in the direction in which the other end of the balanced line 2 extends.

The operation of the second embodiment will be explained.

Each of the wireless communication terminals 6 existing in the direction in which the balanced line 2 extends cannot receive the radio waves leaked from the balanced line 2. However, since the signal sent from the base station 1 is transmitted to the transmitting and receiving antenna 13 through the balanced line 2, the transmitting and receiving antenna 13 radiates radio waves. The radiated radio waves are received by the transmitting and receiving antenna 6a of each of the wireless communication terminals 6. Moreover, the radio waves radiated from the transmitting and receiving antenna 6a of each of the wireless communication terminals 6 are received by the transmitting and receiving antenna 13. The received signal is transmitted to the base station 1 through the balanced line 2.

Accordingly, even when each of the wireless communication terminals 6 exists in the direction in which the other end of the balanced line 2 extends, reliable good wireless communication between the base station 1 and each of the wireless communication terminals 6 can be performed.

Particularly, since the transmitting and receiving antenna 13 has directivity in the direction in which the other end of the balanced line 2 extends, even if the distance between the transmitting and receiving antenna 13 and each of the wireless communication terminals is long, the wireless communication terminal 6 can reliably receive the radiated waves from the transmitting and receiving antenna 13. That is, the same effect as when the length of the balanced line 2 is made longer is obtained.

The remaining configuration, functions, and effects are the same as those in the first embodiment. Thus, an explanation of them will be omitted.

[3] A third embodiment of the invention will be explained.

As shown in FIG. 3, a plurality of desks 22 are arranged in a matrix in an office. Of the area where the desks 22 are arranged, the top half of the figure as a first wireless communication segment 23 and the bottom half of the figure as a second wireless communication segment 24.

On the ceiling above the first wireless communication segment 23, a balanced line 25 composed of a pair of lines 25a, 25b is laid so as to go across almost the central part of the first wireless communication segment 23. A base station 27 is connected to one end of the balanced line 25 and a nondirectional transmitting and receiving antenna 29 is connected to the other end of the balanced line 25.

The balanced line 25 not only transmits the signal sent from the base station 27 to the transmitting and receiving antenna 29 and at the same time leaks a part of the transmitted signal as the radio waves, but also transmits the received signal at the transmitting and receiving antenna 29 to the base station 27. Moreover, the balanced line 25 is more lightweight and more flexible than an ordinary leakage transmission cable.

On the ceiling above the second wireless communication segment 24, a balanced line 26 composed of a pair of lines 26a, 26b is laid so as to go across almost the central part of the second wireless communication segment 24. A base station 28 is connected to one end of the balanced line 26 and a nondirectional transmitting and receiving antenna 30 is connected to the other end of the balanced line 26.

The balanced line 26 not only transmits the signal sent from the base station 28 to the transmitting and receiving antenna 30 and at the same time leaks a part of the transmitted signal as the radio waves, but also transmits the received signal at the transmitting and receiving antenna 30 to the base station 28. Moreover, the balanced line 26 is more lightweight and more flexible than an ordinary leakage transmission cable.

On some of the desks 22 in the first wireless communication segment 23, some built-in antenna wireless communication terminals 31 are provided. Moreover, some built-in antenna wireless communication terminals 32 are provided also in the direction in which the other end of the balanced line 25 extends. Further, on some of the desks 22 in the second wireless communication segment 24, some built-in antenna wireless communication terminals 33 are provided. The wireless communication terminals 31, 32, 33 may be movable or immovable.

The operation of the third embodiment will be explained.

The signal sent from the base station 27 is transmitted through the balanced line 25. At the same time, a part of the signal leaks around as the radio waves. The leaked radio wave is received by a wireless communication terminal 31 located are along the balanced line 25. The radio wave radiated from the wireless communication terminal 31 is received by the balanced line 25. The received signal is transmitted to the base station 27 through the balanced line 25.

Thus wireless communication between the base station 27 and the wireless communication terminal 31 becomes possible.

A wireless communication terminal 32 existing in the direction in which the other end of the balanced line 25 extends cannot receive the radio waves leaked from the balanced line 25. However, since the signal sent from the base station 27 is transmitted by to the transmitting and receiving antenna 29 through the balanced line 25, radio waves are radiated from the transmitting and receiving antenna 29. The radiated radio waves are received by the wireless communication terminal 32. Moreover, the radio wave radiated from the wireless communication terminal 32 is received by the transmitting and receiving antenna 29. The received signal is transmitted to the base station 27 through the balanced line 25.

Accordingly, even when the wireless communication terminal 32 exists in the direction in which the other end of the balanced line 25 extends, reliable, good wireless communication between the base station 27 and wireless communication terminal 32 can be performed.

On the other hand, the signal sent from the base station 28 is transmitted through the balanced line 26. At the same time, a part of the signal leaks around as the radio waves. The leaked waves are received by the wireless communication terminal 33 located are along the balanced line 26. Moreover, the radio wave radiated from the wireless communication terminal 33 is received by the balanced line 26. The received signal is transmitted to the base station 28 through the balanced line 26.

Thus, radio communication between the base station 28 and the wireless communication terminal 33 becomes possible.

The wireless communication terminal 34 existing in the direction in which the other end of the balanced line 26 extends cannot receive the radio waves leaked from the balanced line 26. However, since the signal sent from the base station 28 is transmitted to the transmitting and receiving antenna 30 through the balanced line 26, radio waves are radiated from the transmitting and receiving antenna 30. The radiated radio waves are received by the wireless communication terminal 34. Moreover, the radio wave radiated from the wireless communication terminal 34 is received by the transmitting and receiving antenna 30. The received signal is transmitted to the base station 28 through the balanced line 26.

Accordingly, even when the wireless communication terminal 34 exists in the direction in which the other end of the balanced line 26 extends, reliable good wireless communication between the base station 28 and wireless communication terminal 34 can be performed.

Since the balanced lines 25, 26 are lightweight and flexible, it is easy to lay them on the ceiling of the office. Moreover, when the layout of the individual desks 22 is changed, the work of laying the balanced lines 25, 26 again is easy.

[4] A fourth embodiment of the invention will be explained.

In FIG. 3, transmitting and receiving antennas whose directivity is in the direction in which the other end of each of the balanced lines 25, 26 extends are used as the transmitting and receiving antennas 29, 30.

In this case, since the transmitting and receiving antennas 29, 30 have directivity in the directions in which the other ends of the balanced lines 25, 26 extend, respectively, even if the distance between the transmitting and receiving antenna 29 and the wireless communication terminal 32 is long, or even if the distance between the transmitting and receiving antenna 30 and the wireless communication terminal 34 is long, the wireless communication terminals 32, 34 can receive the radiated radio waves from the transmitting and receiving antennas 29, 30 reliably. That is, the fourth embodiment produces the same effect as when the balanced lines 25, 26 are lengthened.

The remaining configuration, operation, and effect are the same as those of the third embodiment. Thus, an explanation of them will be omitted.

[5] A fifth embodiment of the invention will be explained.

As shown in FIG. 4, a plurality of desks 22 are arranged laterally in the office. Another plurality of desks 22 are arranged laterally so as to face the desks 22 in a one-to-one correspondence.

Above the individual desks 22 and in the direction in which the individual desks 22 are arranged, a balanced line 36 composed of a pair of lines 36a, 36b is laid. A base station 35 is connected to one end of the balanced line 36. A nondirectional transmitting and receiving antenna 37 is connected to the other end of the balanced line 36.

The balanced line 36 not only transmits the signal sent from the base station 35 to the transmitting and receiving antenna 37 and at the same time leaks a part of the transmitted signal as the radio waves, but also transmits the received signal at the transmitting and receiving antenna 37 to the base station 35. Moreover, the balanced line 36 is more lightweight and more flexible than an ordinary leakage transmission cable.

Then, on some of the desks 22, some built-in antenna wireless communication terminals 38 are provided. Moreover, some built-in antenna wireless communication terminals 39 are provided also in the direction in which the other end of the balanced line 36 extends. The wireless communication terminals 38, 39 may be movable or immovable.

The operation of the fifth embodiment will be explained.

The signal sent from the base station 35 is transmitted through the balanced line 36. At the same time, a part of the signal leaks around as the radio waves. The leaked radio waves are received by each of the wireless communication terminals 38 located are along the balanced line 36. The radio waves radiated from the individual wireless communication terminals 38 are received by the balanced line 36. The received signal is transmitted to the base station 35 through the balanced line 36.

Thus, wireless communication terminal between the base station 35 and each of the individual wireless communication terminals 38 can be performed.

The wireless communication terminal 39 existing in the direction in which the other end of the balanced line 36 extends cannot receive the radio waves leaked from the balanced line 36. However, since the signal sent from the base station 35 is transmitted to the transmitting and receiving antenna 37 through the balanced line 36, the transmitting and receiving antenna 37 radiates radio waves. The radiated radio waves are received by the wireless communication terminal 39. Moreover, the radio waves radiated from the wireless communication terminal 39 are received by the transmitting and receiving antenna 37. The received signal is transmitted to the base station 35 through the balanced line 36.

Accordingly, even when the wireless communication terminal 39 exists in the direction in which the other end of the balanced line 36 extends, reliable good wireless communication between the base station 35 and wireless communication terminal 39 can be performed.

Since the balanced line 36 is lightweight and flexible, when the layout of the individual desks 22 is changed, the work of laying the balanced line again is easy.

[6] A sixth embodiment of the invention will be explained.

In FIG. 4, a transmitting and receiving antenna whose directivity is in the direction in which the other end of the balanced line 36 extends is used as the transmitting and receiving antenna 37.

In this case, since the transmitting and receiving antenna 37 has directivity in the direction in which the other end of the balanced line 36 extends, even when the distance between the transmitting and receiving antenna 37 and the wireless communication terminal 39 is long, the wireless communication terminal 39 can receive the radiated radio waves from the transmitting and receiving antenna 37 reliably. That is, the sixth embodiment produces the same effect as when the balanced line 36 is lengthened.

The remaining configuration, operation, and effect are the same as those of the fifth embodiment. Thus, an explanation of them will be omitted.

[7] A seventh embodiment of the invention will be explained.

Figure 5:
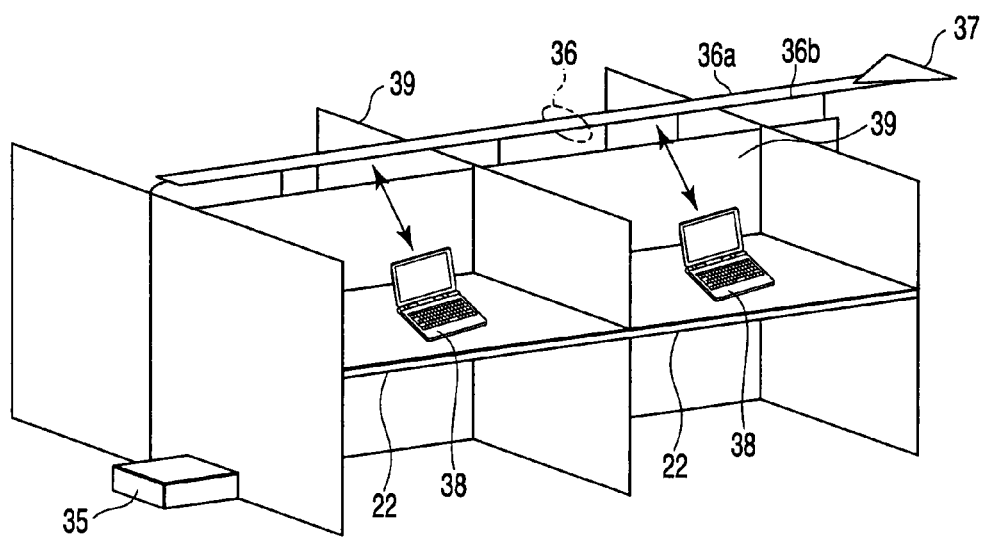
FIG. 5 shows a concrete example of FIG. 4.

As shown in FIG. 5, the individual disks 22 are divided with partitions 39. Along the upper edge of the partitions 39, the balanced line 36 is laid.

The transmitting and receiving antenna 37 may be nondirectional or has directivity in the direction in which the other end of the balanced line 36 extends.

The remaining configuration, operation, and effect are the same as those of the fifth embodiment. Thus, an explanation of them will be omitted.

[8] An eighth embodiment of the invention will be explained.

Figure 6:
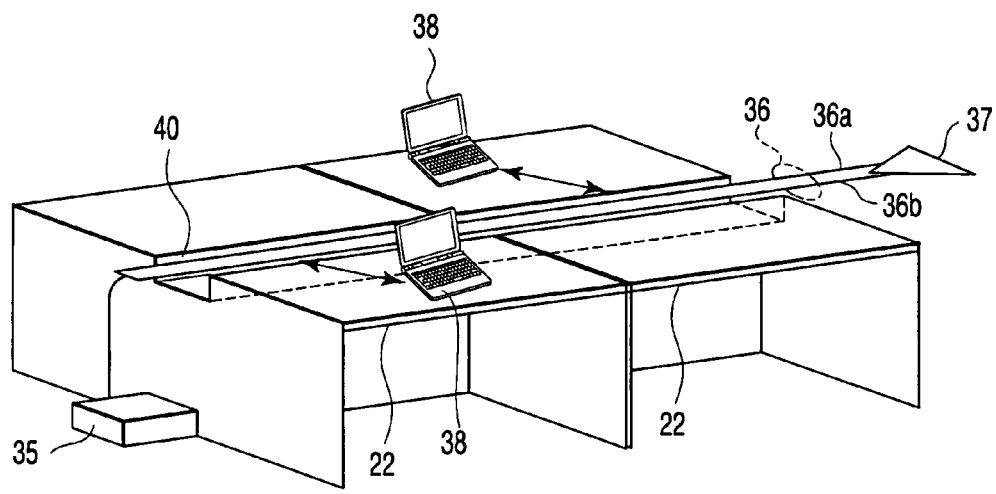
FIG. 6 shows another concrete example of FIG. 4.

As shown in FIG. 6, a groove 40 is made in the boundary between the individual disks 22 facing each other. In the groove 40, the balanced line 36 is laid.

The transmitting and receiving antenna 37 may be nondirectional or has directivity in the direction in which the other end of the balanced line 36 extends.

The remaining configuration, operation, and effect are the same as those of the fifth embodiment. Thus, an explanation of them will be omitted.

[9] A ninth embodiment of the invention will be explained.

Figure 7:
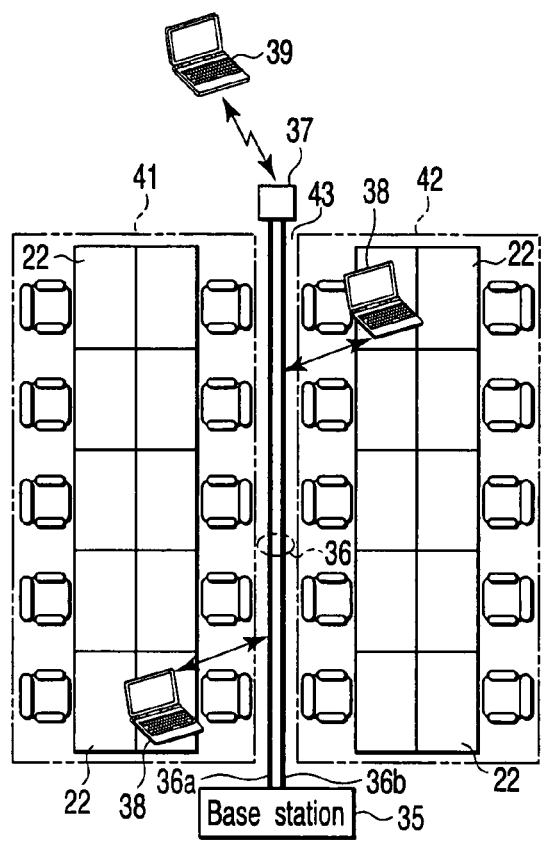
FIG. 7 shows the configuration of a fifth embodiment of the invention.

As shown in FIG. 7, in a first desk sequence 41 in an office, a plurality of disks 22 are arranged laterally. Another plurality of disks 22 are arranged laterally so as to face the disks 22 in a one-to-one correspondence.

In the office, in a second desk sequence 42 adjacent to the first desk sequence 41, a plurality of disks 22 are arranged laterally. Another plurality of disks 22 are arranged laterally so as to face the disks 22 in a one-to-one correspondence.

Then, in space 43 between the first desk sequence 41 and second desk sequence 42, the balanced line 36 is laid.

The operation of the ninth embodiment will be explained.

The signal sent from the base station 35 is transmitted through the balanced line 36. At the same time, a part of the signal leaks around as the radio waves. The leaked radio waves are received by the wireless communication terminal 38 on the first desk sequence 41 and the wireless communication terminal 38 on the second desk sequence 42. The radio waves radiated from the individual wireless communication terminals 38 on the desk sequences 41, 42 are received by the balanced line 36. The received signal is transmitted to the base station 35 through the balanced line 36.

Thus, wireless communication between the base station 35 and each of the wireless communication terminals 38 becomes possible.

The wireless communication terminal 39 existing in the direction in which the other end of the balanced line 36 extends cannot receive the radio waves leaked from the balanced line 36. However, since the signal sent from the base station 35 is transmitted to the transmitting and receiving antenna 37 through the balanced line 36, the transmitting and receiving antenna 37 radiates radio waves. The radiated radio waves are received by the wireless communication terminal 39. Moreover, the radio waves radiated from the wireless communication terminal 39 are received by the transmitting and receiving antenna 37. The received signal is transmitted to the base station 35 through the balanced line 36.

Accordingly, even when the wireless communication terminal 39 exists in the direction in which the other end of the balanced line 36 extends, reliable good wireless communication between the base station 35 and wireless communication terminal 39 can be performed.

The transmitting and receiving antenna 37 may be nondirectional or has directivity in the direction in which the other end of the balanced line 36 extends.

The remaining configuration, operation, and effect are the same as those of the fifth embodiment. Thus, an explanation of them will be omitted.

[10] A tenth embodiment of the invention will be explained.

Figure 8:
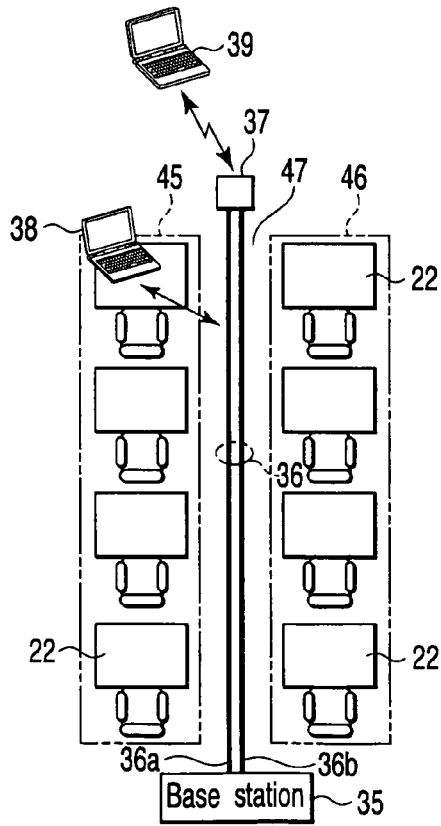
FIG. 8 shows the configuration of a sixth embodiment of the invention.

As shown in FIG. 8, a plurality of disks 22 are arranged in a line in a first desk sequence 45 in an office.

In the room, a plurality of disks 22 are arranged in a line in a second desk sequence 46 adjacent to the first desk sequence 45.

In the space 47 between the first desk sequence 45 and second desk sequence 46, the balanced line 36 is laid.

The remaining configuration, operation, and effect are the same as those of the fifth embodiment. Thus, an explanation of them will be omitted.

The operation of the tenth embodiment will be explained.

The signal sent from the base station 35 is transmitted through the balanced line 36. At the same time, a part of the signal leaks around as the radio waves. The leaked radio waves are received by the wireless communication terminal 38 on the first desk sequence 45 and the wireless communication terminal 38 on the second desk sequence 46. The radio waves radiated from the individual wireless communication terminals 38 in the desk sequences 45, 46 are received by the balanced line 36. The received signal is transmitted to the base station 35 through the balanced line 36.

Thus, wireless communication between the base station 35 and each of the wireless communication terminals 38 becomes possible.

The wireless communication terminal 39 existing in the direction in which the other end of the balanced line 36 extends cannot receive the radio waves leaked from the balanced line 36. However, since the signal sent from the base station 35 is sent to the transmitting and receiving antenna 37 on the side of the other end of the balanced line 36, the transmitting and receiving antenna 37 radiates radio waves. The radiated radio waves are received by the wireless communication terminal 39. The radio waves radiated from the wireless communication terminal 39 are received by the transmitting and receiving antenna 37. The received signal is transmitted to the base station 35 through the balanced line 36.

Accordingly, even when the wireless communication terminal 39 exists in the direction in which the other end of the balanced line 36 extends, reliable good wireless communication between the base station 35 and wireless communication terminal 39 can be performed.

The transmitting and receiving antenna 37 may be nondirectional or has directivity in the direction in which the other end of the balanced line 36 extends.

[11] Modification

The wireless communications system of the invention can be provided not only in an office but also in a school, a store, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communications system comprising:
   a base station;
   a transmitting and receiving antenna;
   a balanced line composed of a pair of lines, one end of balanced line being connected to the base station and the other end of balanced line being connected to the transmitting and receiving antenna, the balanced line not only transmitting a signal sent from the base station to the transmitting and receiving antenna and at the same time leaking a part of the transmitted signal as the radio waves but also transmitting a received signal at the transmitting and receiving antenna to the base station; and
   one or more wireless communication terminals which transmit or receive radio waves to or from either the line or the transmitting and receiving antenna.

2. The wireless communications system according to claim 1, wherein the transmitting and receiving antenna is nondirectional.

3. The wireless communications system according to claim 1, wherein the transmitting and receiving antenna has directivity in the direction in which the other end of the lines extend.

4. The wireless communications system according to claim 1, wherein the balanced line is laid on the ceiling of a room where the wireless communication terminal exists.

5. The wireless communications system according to claim 1, wherein the balanced line is laid on the floor of a room where the wireless communication terminal exists.

6. A wireless communications method of transmitting or receiving radio waves to or from one or more wireless communication terminals, comprising:
   transmitting a signal sent from a base station connected to one end of a balanced line including a pair of lines to a transmitting and receiving antenna connected to the other end of the balanced line;
   leaking a part of the transmitted signal from the balanced line as radio waves at the same time when the base station transmits the signal; and
   transmitting a received signal at the transmitting and receiving antenna to the base station.

7. The wireless communications method according to claim 6, wherein the transmitting and receiving antenna is nondirectional.

8. The wireless communications method according to claim 6, wherein the transmitting and receiving antenna has directivity in the direction in which the other end of the balanced line extends.

9. The wireless communications method according to claim 6, wherein the balanced line is laid on a ceiling of a room where the wireless communication terminal exists.

10. The wireless communications method according to claim 6, wherein the balanced line is laid on a floor of a room where the wireless communication terminal exists.

11. A wireless communications apparatus for transmitting or receiving radio waves to or from one or more wireless communication terminals, comprising:
   a base station;
   a transmitting and receiving antenna; and
   a balanced line including a pair of lines, one end of the balanced line being connected to the base station and the other end of the balanced line being connected to the transmitting and receiving antenna, the balanced line not only transmitting a signal sent from the base station to the transmitting and receiving antenna and at the same time leaking a part of the transmitted signal as the radio waves but also transmitting a received signal at the transmitting and receiving antenna to the base station.

12. The wireless communications apparatus according to claim 11, wherein the transmitting and receiving antenna is nondirectional.

13. The wireless communications apparatus according to claim 11, wherein the transmitting and receiving antenna has directivity in the direction in which the other end of the balanced line extends.

14. The wireless communications apparatus according to claim 11, wherein the balanced line is laid on a ceiling of a room where the wireless communication terminal exists.

15. The wireless communications apparatus according to claim 11, wherein the balanced line is laid on a floor of a room where the wireless communication terminal exists.

* * * * *